United States Patent
Mueller-Brincken (10) Patent No.: US 12,304,293 B2
(45) Date of Patent: May 20, 2025

(54) METHOD FOR MOUNTING AN ENERGY STORE ON A BODY OF A VEHICLE, AND VEHICLE

(71) Applicant: Bayerische Motoren Werke Aktiengesellschaft, Munich (DE)

(72) Inventor: Jan Mueller-Brincken, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 538 days.

(21) Appl. No.: 17/595,544

(22) PCT Filed: Jun. 4, 2020

(86) PCT No.: PCT/EP2020/065486
§ 371 (c)(1),
(2) Date: Nov. 18, 2021

(87) PCT Pub. No.: WO2020/245274
PCT Pub. Date: Dec. 10, 2020

(65) Prior Publication Data
US 2022/0203817 A1 Jun. 30, 2022

(30) Foreign Application Priority Data
Jun. 7, 2019 (DE) ............. 10 2019 115 520.7

(51) Int. Cl.
*B60K 1/04* (2019.01)
*H01M 50/227* (2021.01)
(Continued)

(52) U.S. Cl.
CPC ............. *B60K 1/04* (2013.01); *H01M 50/227* (2021.01); *H01M 50/249* (2021.01); *H01M 50/264* (2021.01); *H01M 2220/20* (2013.01)

(58) Field of Classification Search
CPC ............. B60K 1/04; B60K 2001/0411; B60K 2001/0416; B60K 2001/0438;
(Continued)

(56) References Cited

U.S. PATENT DOCUMENTS 6,227,322 B1 * 5/2001 Nishikawa ............. B60R 16/04
180/68.5
7,749,644 B2 7/2010 Nishino
(Continued)

FOREIGN PATENT DOCUMENTS

CN 102171480 A 8/2011
CN 103192688 A 7/2013
(Continued)

OTHER PUBLICATIONS

English translation of Chinese-language Office Action issued in Chinese Application No. 202080041063.5 dated Dec. 8, 2023 (11 pages).
(Continued)

*Primary Examiner* — Jeffrey J Restifo
(74) *Attorney, Agent, or Firm* — Crowell & Moring LLP (57) ABSTRACT

A method for mounting an energy store, which is configured for the storage of electrical energy, on a body of a vehicle, is provided. In the case of the method, at least one first value which characterizes at least one dimension is determined. At least one clamping element is selected in a manner which is dependent on the determined value. The selected clamping element is clamped between the body and the energy store, as a result of which the energy store is braced to the body.

14 Claims, 2 Drawing Sheets

(51) Int. Cl.
   *H01M 50/249* (2021.01)
   *H01M 50/264* (2021.01)

(58) Field of Classification Search
   CPC ... B60L 50/66; H01M 50/249; H01M 50/227; H01M 50/264
   See application file for complete search history.

(56) References Cited

U.S. PATENT DOCUMENTS

| | | | |
|---|---|---|---|
| 8,210,301 B2* | 7/2012 | Hashimoto | B60K 1/04 |
| | | | 180/68.5 |
| 10,183,698 B2* | 1/2019 | Ta | B62D 21/12 |
| 10,207,574 B2* | 2/2019 | Ozawa | H01M 50/204 |
| 10,308,132 B2 | 6/2019 | Milton et al. | |
| 10,494,030 B1* | 12/2019 | Paramasivam | B60K 1/04 |
| 10,513,170 B1* | 12/2019 | Dawson | B60L 50/66 |
| 10,559,793 B2* | 2/2020 | Smith | H01M 10/6554 |
| 11,007,899 B2* | 5/2021 | Wang | B60L 50/64 |
| 11,021,070 B2* | 6/2021 | Miyoshi | H01M 50/249 |
| 11,325,453 B2* | 5/2022 | Friedman | H01M 50/249 |
| 11,827,086 B2* | 11/2023 | Övgård | H01M 50/249 |
| 2011/0263375 A1 | 10/2011 | Man | |
| 2017/0338529 A1 | 11/2017 | Speichermann | |
| 2018/0237075 A1* | 8/2018 | Kawabe | B60L 50/66 |
| 2018/0334196 A1 | 11/2018 | Erlacher et al. | |
| 2019/0047419 A1 | 2/2019 | Kellner et al. | |
| 2022/0144065 A1* | 5/2022 | Tatsuwaki | B60K 1/04 |
| 2023/0072758 A1* | 3/2023 | Kataria | B62D 65/10 |
| 2023/0113832 A1* | 4/2023 | Bobel | B60W 40/13 |
| | | | 701/301 |
| 2023/0373284 A1* | 11/2023 | Zhang | H01M 50/249 |
| 2023/0420787 A1* | 12/2023 | Baseri | H01M 10/6556 |

FOREIGN PATENT DOCUMENTS

| | | |
|---|---|---|
| CN | 109383258 A | 2/2019 |
| DE | 100 24 763 A1 | 11/2001 |
| DE | 10 2010 050 826 A1 | 5/2012 |
| DE | 10 2012 025 285 A1 | 6/2014 |
| DE | 10 2017 115 041 A1 | 1/2019 |
| DE | 10 2018 109 296 B3 | 9/2019 |
| WO | WO 2018/032730 A1 | 2/2018 |
| WO | WO 2018/035060 A1 | 2/2018 |

OTHER PUBLICATIONS

International Search Report (PCT/ISA/210) issued in PCT Application No. PCT/EP2020/065486 dated Aug. 4, 2020 with English translation (five (5) pages).

German-language Written Opinion (PCT/ISA/237) issued in PCT Application No. PCT/EP2020/065486 dated Aug. 4, 2020 (five (5) pages).

German-language Search Report issued in German Application No. 10 2019 115 520.7 dated May 29, 2020 with partial English translation (11 pages).

* cited by examiner

METHOD FOR MOUNTING AN ENERGY STORE ON A BODY OF A VEHICLE, AND VEHICLE

BACKGROUND AND SUMMARY OF THE INVENTION

The invention relates to a method for mounting an energy store on a body of a vehicle. Furthermore, the invention relates to a vehicle on which an energy store is mounted.

DE 10 2010 050 826 A1 discloses an arrangement of at least one traction battery in an electrically driven motor vehicle, wherein the battery is supported in a battery box between axles of the motor vehicle and between longitudinally extending side sills on an underbody of a vehicle body and at a defined distance to the sills. Furthermore, DE 10 2012 025 285 A1 discloses an arrangement of an electric storage device on a bodyshell of a passenger car.

It is an object of the present invention to devise a method and a vehicle so that an energy store designed to store electric energy can be mounted particularly advantageously on a body of the vehicle.

According to the invention, this object is achieved by a method and by a vehicle having the features of the independent claims. Advantageous refinements of the invention are the subject matter of the dependent claims.

A first aspect of the invention relates to a method for mounting an energy store designed to store electric energy or electric current on a body of a vehicle. Within the context of mounting the energy store, also designated as mounting, on the body, the energy store is mounted on the body. This means that the energy store is arranged on the body and is held or fixed on the body. The vehicle is preferably designed as a motor vehicle, wherein the vehicle can in particular be designed as an automobile and preferably as a passenger car. The body is preferably a self-supporting bodyshell of the vehicle, wherein the self-supporting bodyshell is also simply designated as a bodyshell. For example, the body delimits an internal space of the vehicle, in the internal space of which occupants or passengers of the vehicle can stay.

In a first step of the method, at least one value characterizing at least one dimension, in particular of the vehicle, is determined. The dimension is, for example, an external dimension of the energy store. In particular, the dimension, in particular the external dimension, can be a length, a height or a width of the energy store. Furthermore, the dimension can, for example, be a distance between a first point, in particular a first surface, of the energy store and a second point, in particular a second surface, of the body. The surfaces are, for example, bearing surfaces, via which, for example, the energy store can be or will be supported, in particular directly, on the body, in particular in such a way that the surfaces touch each other directly. For example, the dimension, in particular the length, extends in the vehicle longitudinal direction in the installed position of the energy store, wherein the energy store assumes its installed position in the completely produced state of the vehicle and thus in the state of the energy store mounted on the body. Accordingly, the width based on the installed position extends in the vehicle transverse direction, wherein, for example, the height based on the installed position extends in the vehicle vertical direction.

In a second step of the method, depending on the at least one determined value and thus depending on the dimensions, at least one clamping element is selected. In particular, provision is made in the second step that the at least one clamping element is selected from a group of clamping elements, which means from multiple clamping elements, in a manner depending on the determined value. Expressed again in other words, for example, in the second step multiple clamping elements that differ from one another are provided. The at least one clamping element is selected in a manner depending on the determined value and on the multiple clamping elements provided. In particular, the multiple clamping elements that differ from one another differ from one another in at least one respective dimension, also designated as the clamping element dimension, in particular external dimension, of the respective clamping element.

In a third step of the method, the selected clamping element is clamped between the body and the energy store, in particular in a state in which the energy store is arranged on the body and/or is held or fixed on the body. As a result of clamping the selected clamping element between the energy store and the body, the selected clamping element is clamped between the energy store and the body. In this way, the energy store is braced with the body, which means, for example, the energy store is mounted on the body or held or fixed on the body. In particular, provision can alternatively or additionally be made that the energy store and/or the body is additionally stabilized by bracing the energy store with the body.

In principle, it is conceivable that the dimension or the value is determined by using calculations and/or design data. However, it has proven to be particularly advantageous if the energy store is measured by means of a measuring device, whereby the dimension is acquired, i.e. measured, as a dimension of the energy store and then the value characterizing the dimension of the energy store is determined, in particular acquired or measured. Thus, for example, the value is determined as a current value which characterizes the current dimension actually present, in particular of the finished energy store. As a result, the clamping element can be selected particularly precisely and as necessary and matched to the current tolerance situation.

A further embodiment is distinguished by the fact that, depending on the determined value, at least one further value is determined, in particular by means of an electronic computing device, wherein the further value is preferably calculated and determined as a result. The further value characterizes at least one further dimension, resulting from the mounting of the energy store on the body, of a gap produced by mounting the energy store on the body, said gap being delimited on one side by the body and on the other side by the energy store, in particular directly in each case. Based on the installed position, which means in the completely produced state of the motor vehicle, the further dimension of the gap, for example also designated as a width, extends in the vehicle longitudinal direction, in the vehicle transverse direction or in the vehicle vertical direction. The clamping element is also selected in a manner depending on the further value and arranged in the gap, as a result of which the clamping element is clamped between the energy store and the body and the energy store is consequently braced with the body.

The further dimension is, for example, a future or probable dimension based on a time or a time interval at which or during which the further value is determined, which is produced or formed only in the near future and thus in the future with respect to the time or the time interval when the energy store is mounted on the body. Thus, provision is made, for example, that the further dimension or the further value characterizing the further dimension is predicted, which means forecast and, for example, simulated.

It has been shown to be particularly advantageous if at least one second value characterizing at least one second dimension is determined. The second dimension is, for example, a second dimension, in particular a second external dimension or an internal dimension, of the body. The second dimension can be, for example, a length, a width or a height of the body, in particular an installation space delimited by the body, wherein, for example, the length of the body extends in the vehicle longitudinal direction in the completely produced state of the vehicle. The width of the body, for example in the completely produced state of the vehicle, extends in the vehicle transverse direction, and the height of the body, in the completely produced state of the vehicle, extends in the vehicle vertical direction. Within the context of the mounting, the energy store is, for example, arranged at least partly, in particular at least predominantly or completely, in the aforementioned installation space. Furthermore, the second dimension can, for example, be a second distance between a third point, in particular a third surface, of the energy store and a fourth point, in particular a fourth surface, of the body. The third and fourth surface are, for example, bearing surfaces, via which, for example, the energy store is or can be supported on the body, in particular directly, in particular in such a way that the third and fourth surface touch each other directly.

Thus, for example in the second step, provision is made that the at least one clamping element is selected in a manner depending on the determined values and thus depending on the dimensions. In particular, in the second step, provision is made that the at least one clamping element is selected from the group of clamping elements, which means from the multiple clamping elements, in a manner depending on the determined values. Once more expressed in other words, for example in the second step the multiple clamping elements that differ from one another are provided. Depending on the determined values, the at least one clamping element is selected from the multiple clamping elements provided. For example, the further dimension is a third dimension, wherein the further value is a third value. Then, for example, the clamping element dimension is a fourth dimension of the clamping element. Thus, the multiple clamping elements that differ from one another differ from one another, for example, in their respective fourth dimension, in particular fourth external dimension.

The clamping element functions as a bracing element, by means of which the energy store can particularly advantageously be mounted on the body, in particular fixed or held on the body. In particular, as compared with the use of screw fixings for fixing the energy store on the body, the use of the clamping element makes it possible to mount the energy store on the body in a particularly simple, time-saving and inexpensive manner. In particular, the clamping of the clamping element can create an auxiliary connection, in particular between the body and the energy store, wherein the auxiliary connection can be provided in addition to at least one or more screw fixings, by means of which the energy store can be fixed on the body, in particular screwed to the body. As a result of the use of the additional auxiliary connection, for example as compared with the exclusive use of screw connections, particularly advantageous properties of the vehicle can be represented. In particular as compared with the exclusive use of screw fixings, expenditure with regard to screw fixing, screw fixing checking and replacement of the energy store can be reduced. Furthermore, the method according to the invention permits a use of clamping and/or bracing elements in such a way that, as compared with conventional solutions, excessive component deflection can be reduced or limited to a tolerable extent, in particular with regard to add-on parts such as, for example, seats which are mounted on the body.

The invention is based in particular on the following findings. Usually, the attachment of, for example, an energy store designed as a high-voltage storage device to store electric energy, to respective bodies of vehicles, for example designed as bodyshells, is carried out via screw fixings, which are primarily to be found laterally in respective longitudinal members of the respective bodies. By means of such a screw fixing, for example, the respective energy store is screwed laterally to the respective longitudinal member and thus to the respective body, whereby the energy store is fixed on the body. Alternatively or additionally, it is conceivable to attach the energy store to a floor of the body or in the region of the floor of the body. For example, the energy store is attached to one or more seat crossmembers and/or to one or more heel plate crossmembers, in particular of the body. To this end, the energy store is for example screwed in the region of the floor in particular to the respective seat crossmember and/or to the respective heel plate crossmember.

As an alternative or in addition to this, however, an attachment of the energy store to the body by means of at least one or more braced clamping elements is conceivable. To this end, within the context of the mounting, the clamping element, also simply designated as an element, is clamped between the body, for example formed as a self-supporting bodyshell, and the energy store and as a result braced between the body and the energy store. This permits support between the energy store and the bodyshell both during compressive and also tensile stresses. In other words, by means of the bracing of the energy store with the body, effected by means of the clamping element, advantageous support between the energy store and the body can be implemented, so that both compressive and also tensile stresses can be absorbed and also supported particularly advantageously.

Since the clamping element is clamped between the body and the energy store, the clamping element is pressed between the energy store and the body. In order to implement a sufficient transfer of force between the energy store and the body via the clamping element, minimum pressure, that is to say minimum clamping, of the clamping element is advantageous. This minimum pressure should be satisfied in all tolerance forms of the energy store and of the body. In the event of an unfavorable tolerance position of the body and of the energy store, it is possible for considerably higher and excessive pressures of the clamping element to occur as compared with a desired intended pressure, which can lead to undesired deflection of the body, in particular in the region of a center of the floor of the body, and to undesired and excessive deflection of the energy store. As a result of such a deflection, it is possible for damage to the body and/or to the energy store to occur and/or for screw attachment points, at which, for example, the energy store is screwed to the body, to be undesirably or excessively displaced. The latter can, for example, lead to misalignment of a seat arranged in the interior of the vehicle, in particular when the energy store is screwed to a seat crossmember at one of the screw fixing points.

However, the aforementioned problems and disadvantages can now be avoided in a time-saving and inexpensive manner by the method according to the invention. As a result of determining the at least one value or the values and by selecting the clamping element in a manner depending on the determined value or the determined values, a tolerance situation of the body and of the energy store can be taken into account in the selection of the clamping element, so that the clamping element is selected and introduced in a manner matched to the current or present tolerance situation, that is to say can be arranged between the energy store and the body. In other words, within the context of the method according to the invention, the clamping element is an element matched to the tolerance situation, which can be clamped between the body and the energy store. In this way, adequate and desired bracing of the energy store with the body can be implemented by means of the selected clamping element, and excessive bracing of the energy store with the body effected by the clamping element and impermissible or excessive and undesired deformations of the body and of the energy store resulting from such excessive bracing can reliably be avoided.

Furthermore, it has been shown to be particularly advantageous if the body is measured by means of a measuring device, whereby the second dimension is acquired or measured and thus the second value characterizing the second dimension is determined, in particular acquired or measured. Thus, provision is preferably made that the second value is determined or measured as a second current value, which characterizes the actually present and current second dimension of the completely produced body. As a result, the clamping element can be selected particularly precisely and matched to the current tolerance situation, so that, firstly, adequate bracing of the energy store with the body can be ensured. Secondly, excessive bracing and thus excessive deformations of the body and of the energy store can be reliably avoided.

For example, the energy store and the body are measured by means of the identical or by means of the same measuring device. Furthermore, it is conceivable that the energy store is measured by means of a first measuring device and the body is measured by means of a second measuring device provided in addition to the first measuring device and different from the first measuring device. As a result, the values can be determined particularly precisely.

A further embodiment is distinguished by the fact that, depending on the determined first value and depending on the determined second value, in particular by means of the electronic computing device, the at least one further value is determined as a third value or as the third value, wherein the third value is preferably calculated and determined as a result. The third value characterizes the at least one further dimension, resulting from the mounting of the energy store on the body, as a third dimension of the gap produced by mounting the energy store on the body, said gap being delimited on one side by the body and on the other side by the energy store, in particular directly in each case. Based on the installed position, which means in the completely produced state of the motor vehicle, the third dimension of the gap, for example also designated as a width, extends in the vehicle longitudinal direction, in the vehicle transverse direction or in the vehicle vertical direction. The clamping element is also selected in a manner depending on the third value and arranged in the gap, as a result of which the clamping element is clamped between the energy store and the body and the energy store is consequently braced with the body.

The third dimension is, for example, a future or probable dimension based on a time or a time interval at which or during which the third value is determined, which is produced or formed only in the near future and thus in the future with respect to the time or the time interval when the energy store is mounted on the body. Thus, provision is made, for example, that the third dimension or the third value characterizing the third dimension is predicted, which means forecast and, for example, simulated.

The first value and the second value are, for example, measured values or measured data or the first value and the second value are characterized by measured data, which is also designated as measurement data. Thus, provision is preferably made that the measured data or the first value and the second value is processed by means of the electronic computing device in such a way that the third value characterizing the third dimension is predicted. The feature that the third value or the third dimension is predicted or the feature that the third dimension is a future dimension can be understood in particular that the third value characterizing the third dimension is determined, in particular calculated, in particular by means of the electronic computing device at a time or during a time interval, wherein, at the time or during the time interval, the energy store is detached or separated from the body and is thus not yet mounted on the body. In other words, for example, the third value characterizing the third dimension is determined, in particular calculated, before the energy store is mounted on the body. Thus, the third value is predicted, since the energy store is mounted on the body only after the third value has been determined, so that the gap and thus the third dimension are produced or formed only after the third value has been determined, in particular by the mounting of the energy store on the body. Based on the time or the time interval at which or during which the third value is determined, the gap thus arises only in the future as a result of the fact that the energy store is mounted on the body only after the third value has been determined. In this way, the clamping element can be selected particularly precisely and as needed, in particular with regard to its thickness or width.

The third dimension or the third value is thus a dimension of the gap, also designated as a gap dimension, so that a particularly advantageous, gap dimension-specific clamping connection between the body and the energy store can be produced by the method according to the invention. In this way, adequate bracing of the energy store with the body can be implemented by the selected clamping element and, at the same time, excessive bracing and thus excessive deformations can be avoided.

It has been shown to be particularly advantageous if a clamping element formed from a plastic is used as the clamping element. In this way, particularly advantageous bracing of the energy store with the body can be ensured, wherein excessive bracing can be avoided.

In order to be able to implement particularly advantageous clamping and thus bracing between the energy store and the body by means of the clamping element, provision is made in a further refinement of the invention that a clamping element formed from a foam, in particular from a plastic foam, is used as the clamping element. In other words, the clamping element is preferably formed as a foam element, whereby adequately high bracing can be ensured.

In order to implement particularly advantageous attachment of the energy store to the body, provision is made in a further refinement of the invention that the energy store is screwed to the body during the mounting and is thus screwed onto the body. The gap and thus the actual third dimension or the actual third value are generated, for example by the screw fixing or within the context of the screw fixing, for example as a result of the fact that during the screw fixing, the energy store is arranged on the body and is screwed to the body. In particular, the energy store is screwed to the body at at least one screw fixing point or at multiple screw fixing points. After the energy store has been screwed onto the body, for example the selected clamping element is arranged in the gap formed by the screw fixing, in particular inserted into the gap, whereby the clamping element is clamped between the energy store and the body. In this way, the clamping element is clamped, that is to say pressed, and the energy store is braced with the body by means of the clamping element. The third value characterizing the third dimension is for example determined before the energy store is screwed onto the body and is thus predicted, which is advantageous in particular when, for example, the third dimension or the gap cannot be measured, for example owing to a lack of accessibility. Nevertheless, by means of determining, in particular predicting, the third value, the clamping element can then be selected particularly advantageously, so that adequate bracing can be implemented and excess bracing can be avoided.

A second aspect of the invention relates to a vehicle, preferably designed as a motor vehicle, which, for example, can be designed as an automobile, in particular as a passenger car. The motor vehicle has a body preferably designed as a self-supporting bodyshell and an energy store designed to store electric energy or electric current. The energy store is preferably a high-voltage component, of which the electric voltage, in particular electric operating or rated voltage, is preferably higher than 48 volts, in particular higher than 50 volts. For example, the electric voltage, in particular the electric operating or rated voltage, of the energy store can be several hundred volts, in order to be able to implement particularly high electric outputs to drive the vehicle electrically. In particular, the energy store can be a traction battery, by means of which at least one electric machine for driving the vehicle electrically can be supplied with electric energy stored in the energy store. In particular, the energy store can be designed as a high-voltage battery (HV battery). Since the energy store is preferably designed as a high-voltage component (HV component), the energy store is also designated as a high-voltage store.

In order now to be able to attach the energy store particularly advantageously to the body, provision is made in a second aspect of the invention that the vehicle has at least one clamping element, which is at least partly, in particular at least predominantly or completely, clamped between the body and the energy store, whereby the energy store is braced with the body. Advantages and advantageous refinements of the first aspect of the invention are to be viewed as advantages and advantageous refinements of the second aspect of the invention and vice versa.

It has been shown to be particularly advantageous if the clamping element is formed from a plastic. As a result, adequate bracing can be implemented and excessive bracing can be avoided.

A further embodiment is distinguished by the fact that the clamping element is formed from a foam, in particular from a plastic foam, so that the clamping element is preferably formed as a foam element.

The clamping element is designed separately from the energy store and separately from the body and is arranged between the energy store and the body and, as a result, is jammed in or clamped between the energy store and the body. The clamping element is, firstly, supported at least indirectly, in particular directly, on the energy store, in particular on a housing of the energy store, and, secondly, the clamping element is supported at least indirectly, in particular directly, on the body.

Further details of the invention emerge from the following description of a preferred exemplary embodiment with reference to the associated drawings.

In the figures, the same or functionally identical components are provided with the same designations.

DETAILED DESCRIPTION OF THE DRAWINGS

Figure 1:
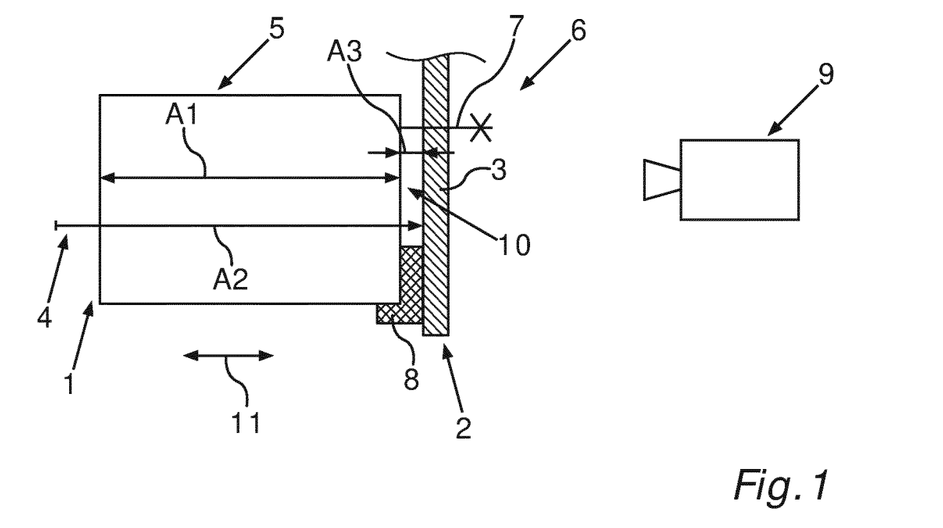
FIG. 1 shows a detail of a schematic sectional view of a vehicle according to the invention in a first embodiment.

FIG. 1 shows a detail in a schematic sectional view of a first embodiment of a vehicle 1, which is designed as a motor vehicle and preferably as an automobile, in particular as a passenger car. The vehicle 1 has a body in the form of a self-supporting bodyshell 2, of which a bodyshell component 3, also designated as a component, can be seen as a detail in FIG. 1. The bodyshell component 3 is, for example, a side sill or a longitudinal member which, for example, is arranged in the vehicle transverse direction on the left or right side of the bodyshell 2. The vehicle transverse direction is illustrated by a double arrow 11 in FIG. 1. For example, the bodyshell 2 has the bodyshell component 3 and at least one further bodyshell component, not illustrated in FIG. 1, wherein the further bodyshell component can be designed, for example, as a further sill or as a further longitudinal member. The bodyshell components are spaced apart from each other in the vehicle transverse direction and, in the vehicle transverse direction, each delimit toward the outside at least partly, in particular at least predominantly or completely, an installation space 4, in which an energy store 5 of the motor vehicle 1, designed to store electric energy or electric current, is at least partly, in particular at least predominantly or completely, arranged. The energy store 5 is at least indirectly, in particular directly, mounted on the bodyshell 2 and as a result held or fixed on the bodyshell 2.

The vehicle 1 is, for example, designed as a hybrid or electric vehicle, in particular as a battery electric vehicle (BEV) and, in its completely produced state, has at least one electric machine, by means of which the vehicle 1 can be driven electrically. For this purpose, the electric machine is operated in a motor mode and thus as an electric motor. In order to operate the electric machine in the motor mode, the electric machine is supplied with electric energy, which is stored in the energy store 5. Thus, the energy store 5 is designed as a traction store, in particular as a traction battery.

In order to be able to implement particularly high electrical outputs to drive the motor vehicle 1 electrically, the energy store 5 is designed as a high-voltage component, which means as a high-voltage store. The energy store 5 thus has an electrical voltage, in particular an electrical operating or rated voltage, which is higher than 50 V and is preferably several 100 V. In particular, the energy store 5 can be designed as a battery, in particular as a high-voltage battery. Since the energy store 5 is arranged in the installation space 4, the energy store 5 is concealed toward the outside in the vehicle transverse direction by the bodyshell component 3 on both sides, in each case at least partly, in particular at least predominantly or completely. Provision can be made for a screw fixing of the energy store 5 with the bodyshell 2 to be omitted. However, it is conceivable that the energy store 5 is screwed to the bodyshell 2 at at least one screw point 6, at least indirectly, in particular directly, by at least one screw element 7 illustrated particularly schematically in FIG. 1. As a result, for example, the energy store 5 is mounted on the bodyshell 2 by screwing or by means of at least one screw connection.

In order now to be able to mount and thus to attach the energy store 5 particularly advantageously on the bodyshell 2, at least one clamping element 8 is provided, which is at least partly, in particular at least predominantly or completely clamped between the bodyshell 2 and the energy store 5. In this way, the clamping element 8 is clamped and thus pressed between the energy store 5 and the bodyshell 2, which means that the energy store 5 is braced with the bodyshell 2. As a result of this bracing of the energy store 5 with the bodyshell 2, the energy store 5 is mounted on the bodyshell 2, wherein the bracing described can replace or permit the omission of the above-described screw connection or all the screw connections between the energy store 5 and the bodyshell 2.

Figure 2:
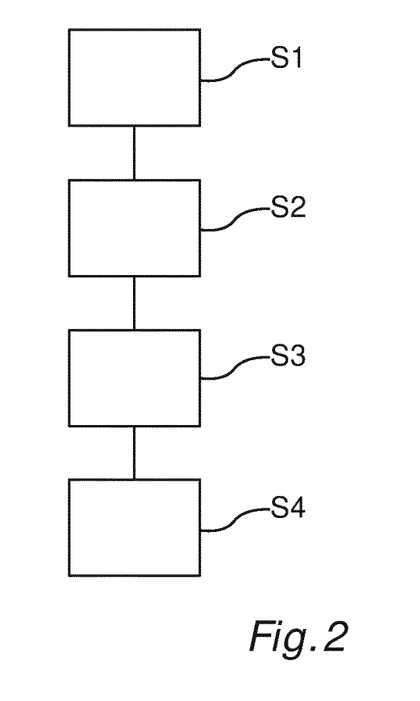
FIG. 2 shows a flow chart to illustrate a method according to the invention.

With reference to FIG. 2, a method for mounting the energy store 5 on the bodyshell 2 will be described below. In a first step S1 of the method, at least one first value characterizing at least one first dimension A1 of the energy store 5 is determined. It can be seen from FIG. 1 that the first dimension A1 of the energy store 5 is, for example, a first external dimension of the energy store 5, wherein the first dimension A1 can be a width extending in the vehicle transverse direction in the installed position of the energy store 5, in particular an external width of the energy store 5. The energy store 5 assumes its installed position in the completely produced state of the motor vehicle 1 which, in its completely produced state, comprises the bodyshell 2 and the energy store 5 mounted thereon.

In a second step S2 of the method, at least one second value characterizing at least one second dimension A2 of the bodyshell 2 is determined. It can be seen from FIG. 1 that the second dimension A2 can be a second external dimension or else a second internal dimension of the bodyshell 2. In particular, the second dimension A2 is a width, for example extending in the vehicle transverse direction, of the installation space 4 delimited by the bodyshell component 3 in the vehicle transverse direction. Thus, the second dimension A2 can be a distance, for example extending in the vehicle transverse direction, between the bodyshell components 3 spaced apart from one another in the vehicle transverse direction.

In a third step S3 of the method, multiple clamping elements that differ from one another are provided, wherein the clamping element 8 is one of the clamping elements provided. For example, the clamping elements are provided in a state detached or separated from the energy store 5 and from the bodyshell 2.

Furthermore, in the third step S3, depending on the determined values, which means depending on the determined first value and depending on the determined second value, the clamping element 8 is selected from the multiple clamping elements. In a fourth step S4 of the method, the selected clamping element 8 is clamped between the bodyshell 2 and the energy store 5, whereby the energy store 5 is braced with the bodyshell 2. For example, the energy store 5 and the bodyshell 2 are measured by means of a measuring device 9, illustrated particularly schematically in FIG. 1, whereby the first value and the second value are determined. In particular, by means of the measuring device 9, the respective dimension A1 and A2 is measured, whereby the first value and the second value are determined, in particular measured.

It can be seen from FIG. 1 that, by arranging the energy store 5 on the bodyshell 2 and by at least partly, in particular by at least predominantly or completely, arranging the energy store 5 in the installation space 4 and thus between the bodyshell components, a gap 10 is formed between the energy store 5 and the bodyshell component 3, wherein the gap 10 is delimited firstly at least indirectly, in particular directly, by the energy store 5 and, secondly, at least indirectly, in particular directly, by the bodyshell component 3. In the present case, the gap 10 is delimited inwardly in the vehicle transverse direction at least indirectly, in particular directly, by the energy store 5 and toward the outside in the vehicle transverse direction at least indirectly, in particular directly, by the bodyshell component 3. In a state in which the energy store 5 is still detached or separated and removed from the bodyshell 2, so that the energy store 5 is arranged completely outside the installation space 4, the gap 10 has not yet been formed.

For example, depending on the determined first value and depending on the determined second value, in particular by means of an electronic computing device, at least one third value is determined, in particular calculated, wherein the third value characterizes at least one third dimension A3, resulting from mounting the energy store 5 on the bodyshell 2, of the gap 10 produced by mounting the energy store 5 on the bodyshell 2. Thus, the third dimension A3 or the third value is predicted. This should be understood to mean that the third dimension A3 or the third value characterizing the third dimension A3 is determined, in particular calculated, before the energy store 5 is arranged or mounted on the bodyshell 2, that is to say before the energy store 5 is arranged in the installation space 4. The gap 10 is produced, for example, as a result and only as a result of the fact that the energy store 5 is arranged on the bodyshell 2 and is at least partly, in particular at least predominantly or completely, arranged in the installation space 4 and is screwed to the bodyshell 2 by means of the screw element 7 at the screw point 6, also designated as a screw fixing point. The third value or the third dimension A3 is not so much measured but, for example, calculated in a manner depending on the first value and depending on the second value.

In the third step S3, the clamping element 8 is then selected from the multiple clamping elements, also in a manner depending on the third value, whereupon the selected clamping element 8 is at least partly, in particular at least predominantly or completely, arranged in the gap 10 and, as a result, clamped between the energy store 5 and the bodyshell 2. In this way, defined forcing or pressing of the clamping element 8 can be implemented, so that adequate bracing of the energy store 5 with the bodyshell 2 can be ensured. Undesired, excessive bracing and resultant excessive deformations can, however, be reliably avoided. It has been shown to be particularly advantageous if the clamping element 8 is formed from a plastic, in particular from a plastic foam, so that defined pressing and bracing can be ensured.

Overall, it can be seen from FIG. 1 that the dimension A3 or the third value is or characterizes a gap dimension of the gap 10 so that, within the context of the method, a gap dimension-specific selection of the clamping element 8 is carried out. Since the clamping element 8 is then arranged in the gap 10 and clamped between the energy store 5 and the bodyshell 2, a gap dimension-specific clamping connection between the energy store 5 and the bodyshell 2 can be implemented by the method. Given this gap dimension-specific clamping connection, adequate bracing between the energy store 5 and the bodyshell 2 can be ensured, but excessive bracing and resultant undesired deformations can be avoided.

Figure 3:
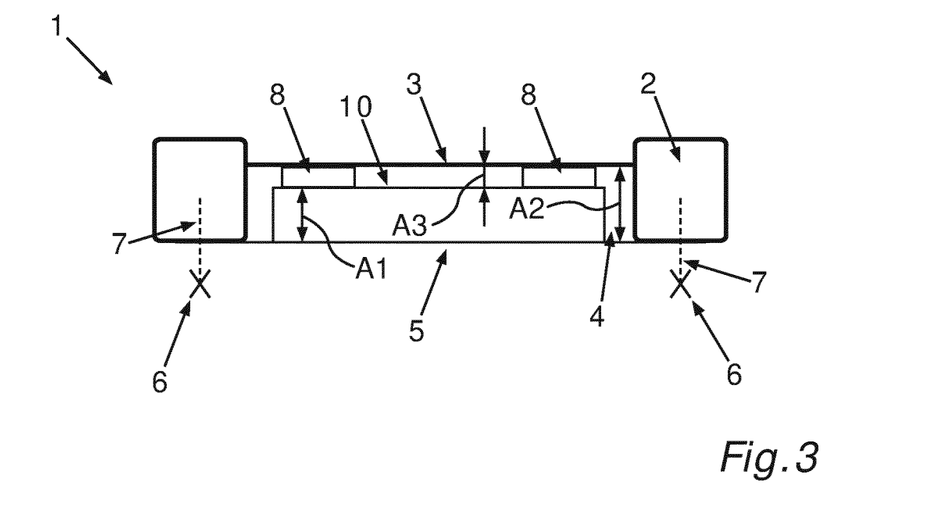
FIG. 3 shows a detail of a schematic sectional view of the vehicle in a second embodiment.

Finally, FIG. 3 shows a second embodiment of the vehicle 1 in a detail of a schematic sectional view. In the second embodiment, the first dimension A1 is a first external dimension of the energy store 5, in particular a height extending in the vehicle vertical direction in the installed position. The second dimension A2 is a distance, extending in the vehicle vertical direction, for example, in the installed position, between a first surface of the energy store 5 and a second surface of the body 2. The first surface is, for example, a first supporting or bearing surface, via which the energy store 5 can be supported at the top and/or directly on the body 2, in particular in the vehicle vertical direction, or is supported in the finally produced state of the vehicle 1. The second surface is, for example, a second supporting or bearing surface, on which, for example, the clamping element 8 is or can be or will be supported at the top and/or directly, in particular in the vehicle vertical direction.

In the second embodiment, the gap 10 is arranged in the vehicle vertical direction between the energy store 5 and the body 2 and is delimited at the top, in particular directly, by the body 2, for example in the vehicle vertical direction. In the vehicle vertical direction, the gap 10 is, for example, delimited at the bottom, in particular directly, by the energy store 5.

LIST OF DESIGNATIONS

1 Vehicle
2 Bodyshell
3 Bodyshell component
4 Installation space
5 Energy store
6 Screw point
7 Screw element
8 Clamping element
9 Measuring device
10 Gap
11 Double arrow
A1 First dimension
A2 Second dimension
A3 Third dimension
S1 First step
S2 Second step
S3 Third step
S4 Fourth step

What is claimed is:

1. A method for mounting an energy store that stores electric energy on a body of a vehicle, comprising:
   determining at least one first value characterizing at least one distance dimension between a first bearing surface of the energy store and an associated second bearing surface of the body by which the energy store is supportable on the body;
   selecting at least one clamping element from a group of multiple clamping elements in a manner depending on the determined first value, wherein
      the multiple clamping elements have external dimensions that differ from one another in the at least one respective dimension; and
   clamping the selected clamping element between the body and the energy store, whereby the energy store is braced with the body.

2. The method according to claim 1, wherein
   the energy store is measured via a measuring device, whereby the first value characterizing the dimension of the energy store is determined.

3. The method according to claim 1, wherein
   at least one second value characterizing at least one second dimension is determined, and
   the at least one clamping element is selected in a manner depending on the determined first and second values.

4. The method according to claim 3, wherein
   the body is measured by way of a measuring device, whereby the second value characterizing the second dimension of the body is determined.

5. The method according to claim 1, wherein
   a clamping element formed from a plastic is used as the clamping element.

6. The method according to claim 1, wherein
   a clamping element formed from a foam is used as the clamping element.

7. The method according to claim 1, wherein
   the energy store is screwed to the body during the mounting.

8. A method for mounting an energy store that stores electric energy on a body of a vehicle, comprising:
   determining at least one first value characterizing at least one dimension;
      selecting at least one clamping element in a manner depending on the determined first value; and
   clamping the selected clamping element between the body and the energy store, whereby the energy store is braced with the body;
   wherein
   depending on the determined first value, by way of an electronic computing device, at least one further value is determined which characterizes at least one further dimension, resulting from the mounting of the energy store, of a gap produced by mounting the energy store, said gap being delimited on one side by the body and on the other side by the energy store, and wherein
   the clamping element is selected in a manner depending on the further value, and
   the selected clamping element is arranged at least partly in the gap, whereby the clamping element is clamped between the body and the energy store.

9. The method according to claim 8, wherein
   at least one second value characterizing at least one second dimension is determined, and
   the at least one clamping element is selected in a manner depending on the determined first and second values.

10. The method according to claim 9, wherein
   the body is measured by way of a measuring device, whereby the second value characterizing the second dimension of the body is determined.

11. A vehicle, comprising:
   a body;
   an energy store designed to store electric energy; and
   at least one clamping element selected from a group of multiple clamping elements, which is clamped between the body and the energy store, whereby
      the energy store is braced with the body, and
      the multiple clamping elements have external dimensions that differ from one another in at least one respective distance dimension between a first bearing surface of the energy store and an associated second bearing surface of the body by which the energy store is supportable on the body.

12. The vehicle according to claim 11, wherein the clamping element is formed from a plastic.
13. The vehicle according to claim 11, wherein the clamping element is formed from a foam.
14. The vehicle according to claim 11, wherein the clamping element is formed from a plastic foam.

* * * * *